(No Model.)
P. JACOBUS.
HAND HOE.
No. 390,679. Patented Oct. 9, 1888.
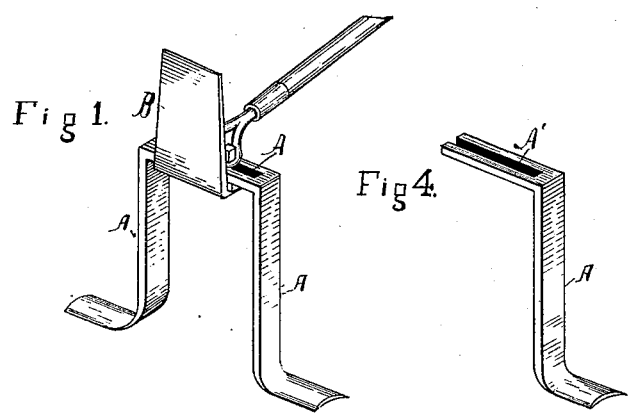
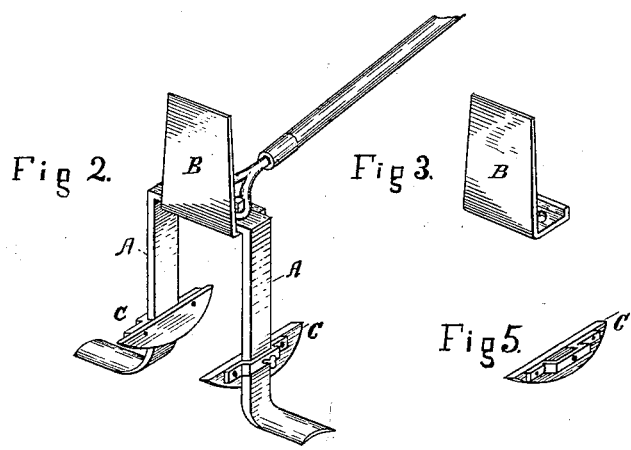
WITNESSES:
George W. Delamarter.
Lyman E. Jacobus.
INVENTOR:
Pierson Jacobus.

UNITED STATES PATENT OFFICE.

PIERSON JACOBUS, OF VARICK, NEW YORK.

HAND-HOE.

SPECIFICATION forming part of Letters Patent No. 390,679, dated October 9, 1888.

Application filed July 5, 1887. Serial No. 243,482. (No model.)

*To all whom it may concern:*

Be it known that I, PIERSON JACOBUS, of the town of Varick, county of Seneca, and State of New York, have invented a new and useful Improvement in Hand-Hoes, of which the following is a specification.

The objects of my improvement are to enable the user to hoe both sides of the plant or drill-row at the same time by the horizontal movement of the hoe-blades and to cut up the weeds and loosen the soil with more rapidity, ease, and effect than by the use of other hoes. I attain these objects by the mechanism illustrated in the accompanying drawings, in which—

Figure 1 represents the hoe (with part of handle) in an adjustable form having two prongs or blades, A, with slots A', as seen in Fig. 4, and in angular form sharpened on both edges, attached to the hoe-blade B (form Fig. 3) at right angles, and fastened together by bolts, which run through the shank, the slots, and the hoe-blade, thus fastening all securely together. The object of the slot is to widen or diminish the width of space between the blades for wide or narrow drill-row or hill. For heavy hoeing the hoe may be inverted and the blade B used.

Fig. 2 represents the hoe made rigid with the blade.

Fig. 5 represents a crescent-shaped attachment, C, that may be placed on the prongs at any desired point and fastened by thumb-screw. The object of it is to cut the crust before the blades when the earth is dry, so as not to disturb the roots of plants while young and tender.

The improved blades, rigid or adjustable, are to be joined to the shank at such an angle as to move backward and forward horizontally through the soil when the handle is held at the usual angle for hoeing. The bottoms of the blades are made a little concave, so that they always keep sharp.

What I claim as new, and desire to secure by Letters Patent, is—

1. In a hand-hoe, the blades A, in combination with the blade B, adjustably secured thereto, substantially as described.

2. In combination with a hoe-blade or knife, a crescent-shaped attachment, C, adapted to be secured on the blade, substantially as described.

3. In a hand hoe, the blades A, in combination with the blade B, secured thereto by bolts and nuts, substantially as described.

PIERSON JACOBUS.

Witnesses:
JAMES WOODRUFF,
WILLIAM P. GOODMAN.